US007343600B2

(12) United States Patent
Caliendo, Jr. et al.

(10) Patent No.: US 7,343,600 B2
(45) Date of Patent: Mar. 11, 2008

(54) PROVIDING AN IMAGE OF INSTALLED SOFTWARE UTILIZING UNINSTALL CODE

(75) Inventors: Neal R. Caliendo, Jr., Raleigh, NC (US); Jeffrey M. Estroff, Cary, NC (US); Michaelle L. Fuccella-Walcutt, Apex, NC (US); James A. Hunt, Chapel Hill, NC (US); Howard J. Locker, Cary, NC (US); John C. Mese, Cary, NC (US); Joshua N. Novak, Raleigh, NC (US); Jose R. Ruiz, Raleigh, NC (US); Rod D. W. Waltermann, Durham, NC (US); Arnold Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 701 days.

(21) Appl. No.: 10/642,890

(22) Filed: Aug. 18, 2003

(65) Prior Publication Data

US 2005/0044096 A1 Feb. 24, 2005

(51) Int. Cl.
 *G06F 9/445* (2006.01)
(52) U.S. Cl. ........................................ 717/174
(58) Field of Classification Search ............... 717/136, 717/146, 124, 106, 175; 712/4; 713/179, 713/181, 176, 187, 188; 726/16, 21, 17, 726/26
 See application file for complete search history.

(56) References Cited

U.S. PATENT DOCUMENTS 5,175,856 A * 12/1992 Van Dyke et al. .......... 717/151

| 5,701,423 | A | | 12/1997 | Crozier |
| 6,061,513 | A | * | 5/2000 | Scandura ..................... 717/142 |
| 6,071,317 | A | * | 6/2000 | Nagel .......................... 717/128 |
| 6,281,893 | B1 | | 8/2001 | Goldstein |
| 6,442,754 | B1 | * | 8/2002 | Curtis ......................... 717/175 |
| 6,591,415 | B1 | * | 7/2003 | Torrubia-Saez ............. 717/159 |
| 6,615,199 | B1 | * | 9/2003 | Bowman-Amuah .......... 706/50 |
| 6,715,145 | B1 | * | 3/2004 | Bowman-Amuah ......... 718/101 |
| 6,721,946 | B1 | * | 4/2004 | Fogarty et al. ............. 717/175 |

(Continued)

OTHER PUBLICATIONS

DERIVE: A Tool That Automatically Reverse-Engineers Instruction Encodings, Dawson R. Engler et al., ACM, 2000, pp. 12-22.*

(Continued)

*Primary Examiner*—Todd Ingberg

(57) ABSTRACT

A method for providing an image of software installed on a computer system is disclosed. The method includes the steps of deconstructing the image into at least one portion and creating at least one module from the at least one portion of the image. The deconstructing step can include the steps of scanning an image and identifying at least one portion of the image to be modularized. The creating step can include the steps of extracting the at least one portion of the image identified to be modularized and generating at least one module from the extracted portion of the image. The modules that are created in accordance with the present invention can be formatted for use in a new image or part of a new image to be used with a software program such as with a hardware-independent imaging tool. Furthermore, the modules can be used with hardware-independent technologies and can facilitate management of image inventory and facilitate deployment of images to new computer systems with different hardware configurations. Furthermore, the method is simple, cost effective and capable of being easily adapted to existing technology.

55 Claims, 5 Drawing Sheets

U.S. PATENT DOCUMENTS

| | | | |
|---|---|---|---|
| 6,742,015 B1* | 5/2004 | Bowman-Amuah | 718/101 |
| 6,748,584 B1* | 6/2004 | Witchel et al. | 717/136 |
| 6,817,014 B2* | 11/2004 | Hundt et al. | 717/159 |
| 6,886,111 B1* | 4/2005 | Tran | 714/38 |
| 6,938,185 B1* | 8/2005 | Bebout et al. | 714/28 |
| 7,047,380 B2* | 5/2006 | Tormasov et al. | 711/162 |
| 7,181,740 B2* | 2/2007 | Purkeypile et al. | 717/176 |
| 7,194,728 B1* | 3/2007 | Sirota et al. | 717/106 |
| 7,228,541 B2* | 6/2007 | Gupton et al. | 717/175 |
| 2002/0035522 A1 | 3/2002 | Pilcher | |
| 2002/0059402 A1 | 5/2002 | Belanger | |
| 2002/0180783 A1 | 12/2002 | Broussard | |
| 2002/0188703 A1 | 12/2002 | Alden | |
| 2002/0191018 A1 | 12/2002 | Broussard | |
| 2003/0033432 A1 | 2/2003 | Simpson et al. | |

OTHER PUBLICATIONS

□□Modular Type-Based Reverse Engineering of Parameterized Types in Java Codes, Dominic Duggan, ACM, 1999, pp. 97-113.*

Leveraging IBM VisualAge for C++ for Reverse Engineering Tasks, Johannes Martin, Nov. 1999, pp. 1 ? 13.*

Understanding Software Systems Using Reverse Engineering Technology Perspectives From Rigi Project, Hausi A. Muller et al., Oct. 1993, pp. 217-226.*

Reverse Engineering: A Roadmap, Hausi Muller et al, May 2000, pp. 47-60.*

Evaluating the Reverse Engineering Capabilities of Web Tools for Understanding Site Content and Structure: A Case Study, Scott Tilley et al, IEEE, 2001, pp. 514-523.*

A Software Reverse Engineering Experience, Erich Buss et al, IBM, 1991, pp. 55-73.*

Ghost User Guide, Soundcraft, 1999, Whole Manual.*

Radio Magazine, Kevin McNamara, "Data Backup Methods", 3 pages Aug. 1, 2002.*

* cited by examiner

PROVIDING AN IMAGE OF INSTALLED SOFTWARE UTILIZING UNINSTALL CODE

FIELD OF THE INVENTION

The present invention relates to imaging technology, and more particularly to a method for providing an image of software installed on a computer system.

BACKGROUND OF THE INVENTION

A conventional computer system typically includes various different hardware subsystems, which constitute a particular hardware configuration. FIG. 1 is a block diagram of a conventional computer system 50 comprising a central processing unit (CPU) 52, a display 54, a hard disk drive 56, input/output (I/O) devices 58, a compact disk (CD) drive 60, and network devices 62.

A computer system is typically purchased with preloaded software, which can include an operating system, hardware drivers, software utilities, and commonly used application software, e.g., word processors and spreadsheets. The software is already loaded/installed on the computer system by the time it is delivered to a customer. The customer can be a large enterprise but is not limited to large enterprises.

The individual software programs that constitute the preloaded software are provided by various software suppliers. For example, the operating system, e.g., Windows NT™ or OS/2™, would be provided by one software supplier. The hardware drivers, e.g., for a CD drive, would be provided by another software supplier. The individual software programs are typically provided on diskettes, the web, or CDs. Preloading the software programs can be substantially cumbersome especially when the number of individual software programs is increased or when the number of computer systems to be preloaded is increased.

The software is typically installed and stored on the hard disk drive of a computer system. The term "image" is used to describe the software installed on a hard disk drive of a computer system. FIG. 2 is a block diagram of a conventional computer system 70 comprising a hard disk drive 72 with an image 74 of the installed software, which can be loaded onto hard drives 76-80 of other computer systems 82-86, respectively. Typically, a customer of the computer manufacturer first purchases the first computer system 70 and customizes and then loads the image 74 onto the customer's other computer systems 82-86.

Managing and loading one image onto another system is much more efficient than manually installing and loading the software programs individually onto the other system. Images are deployed by organizations such as an information technology (IT) shop of a customer. Some of these images can be created and deployed using software utilities/tools such as IBM's ImageUltra™, Microsoft's SysPrep™ or industry standard tools such as PowerQuest's DriveImage™ or Symantech's Ghost™. Many of these software tools are primarily used to create a backup image for reinstallation should any software files become corrupted.

Unfortunately, most of these images require a donor system and are monolithic; i.e., they only work on computer systems with the same hardware configurations. This is because an image is customized to a particular hardware configuration. This is problematic because new images need to be created for new computer systems that are introduced in the customer's environment, where the new computer systems have a different hardware configuration. This problem exists even if the hardware configuration is only slightly different, such as being a different model. As a result, a customer needs to maintain and manage an inventory of images for the different hardware configurations of different computer systems. As the number of hardware configurations increase, the number of images that the customer needs to maintain increases, thus further complicating image-inventory management.

However, new images must still be created for each hardware configuration because the conventional solutions do not modify the images themselves. Images must be built from scratch, which is time consuming and inefficient, especially where there are many computer systems with different hardware configurations. IBM's ImageUltra™ is designed to manage and maintain images.

Accordingly, what is needed is an improved method for providing an image of software installed on a computer system. The method should facilitate management of image inventory and should facilitate deployment of images to new computer systems with different hardware configurations, even when portions of an image are not available for a particular computer system. The method should be simple, cost effective and capable of being easily adapted to existing technology. The present invention addresses such needs.

SUMMARY OF THE INVENTION

A method for providing an image of software installed on a computer system is disclosed. The method includes the steps of deconstructing the image into at least one portion and creating at least one module from the at least one portion of the image. The deconstructing step can include the steps of scanning an image and identifying at least portion of the image to be modularized. The creating step can include the steps of extracting the at least one portion of the image identified to be modularized and generating at least one module from the extracted portion of the image. The modules that are created in accordance with the present invention can be formatted for use in a new image or part of a new image to be used with a software program such as with a hardware-independent imaging tool. Furthermore, the modules can be used with hardware-independent technologies and can facilitate management of image inventory and facilitate deployment of images to new computer systems with different hardware configurations. Furthermore, the method is simple, cost effective and capable of being easily adapted to existing technology.

DETAILED DESCRIPTION

The present invention relates to imaging technology, and more particularly to an improved method for providing an image of software installed on a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method in accordance with the present invention, including the steps of deconstructing an existing image and creating one or more modules from all or part of the image, is disclosed. To deconstruct the image, the image is scanned to identify at least one portion of the image to be modularized. At least one portion of the image is then extracted, and at least one module is generated from that portion of the image. The module can then be formatted for use in a new image or part of a new image to be used with a particular software program, such as with a hardware-independent imaging tool or with other hardware-independent application software. An advantage of making an image modular is that it allows hardware-independent software programs (e.g., operating system, commonly used application software) to be abstracted or separated from hardware-dependent software programs (e.g., device drivers, hardware-dependent software). Modules can be added or removed from an image as needed, or can be combined to create new modular-based images. To more particularly describe the features of the present invention, refer now to the following description in conjunction with the accompanying figures.

Figure 1:
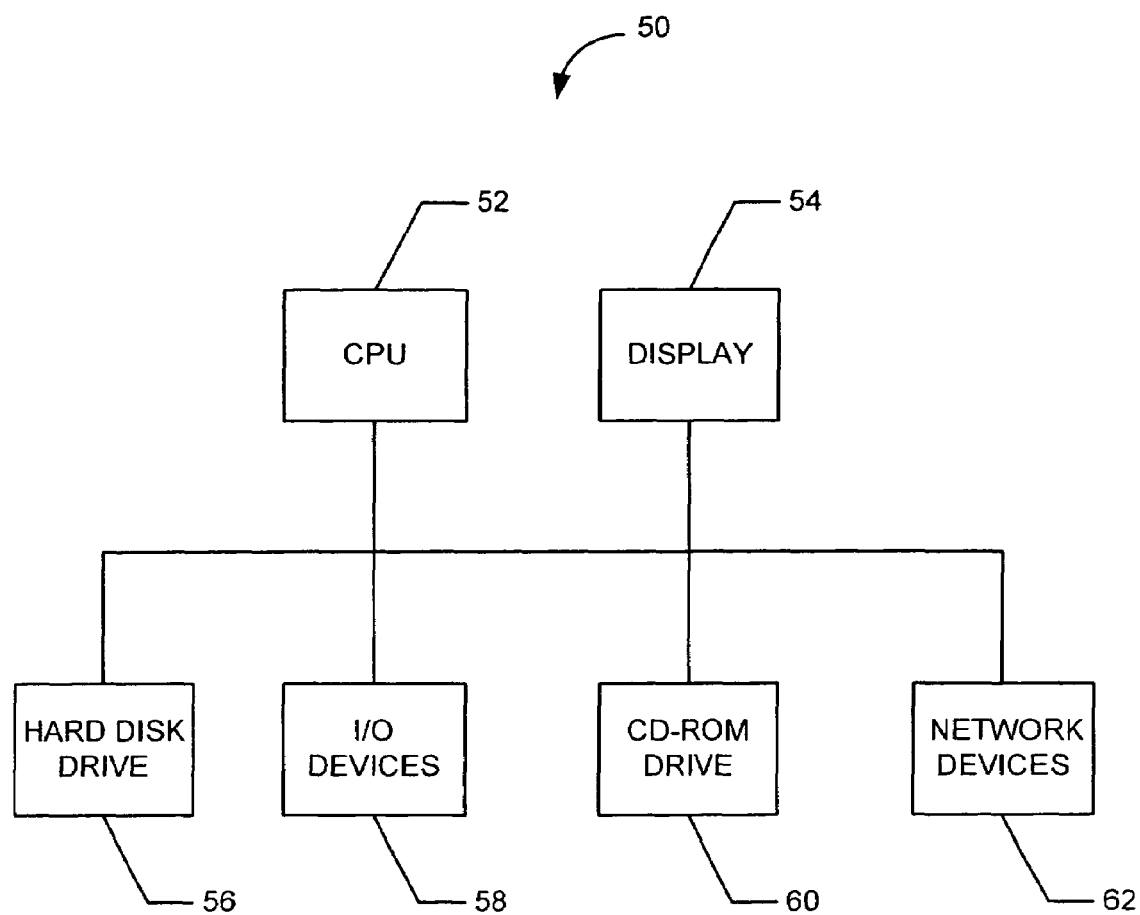
FIG. 1 is a block diagram of a conventional computer system.
Figure 2:
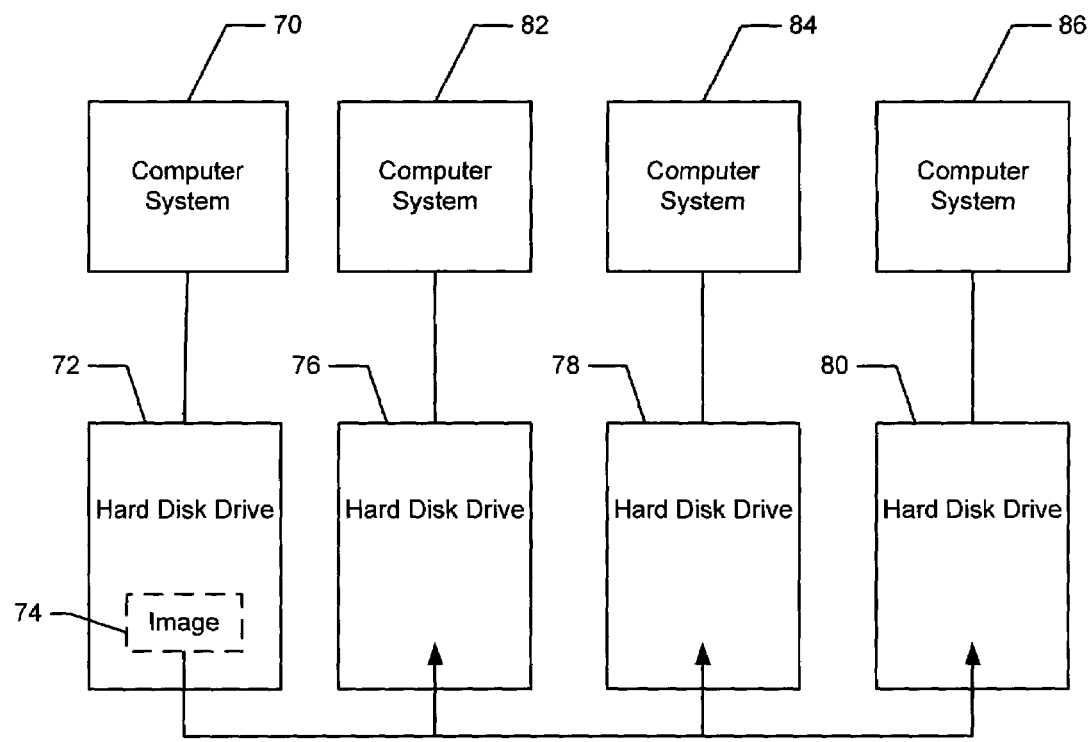
FIG. 2 is a block diagram of a conventional computer system comprising a hard disk drive with an image of preloaded software, which can be loaded onto the hard drives of other computer systems.
Figure 3:
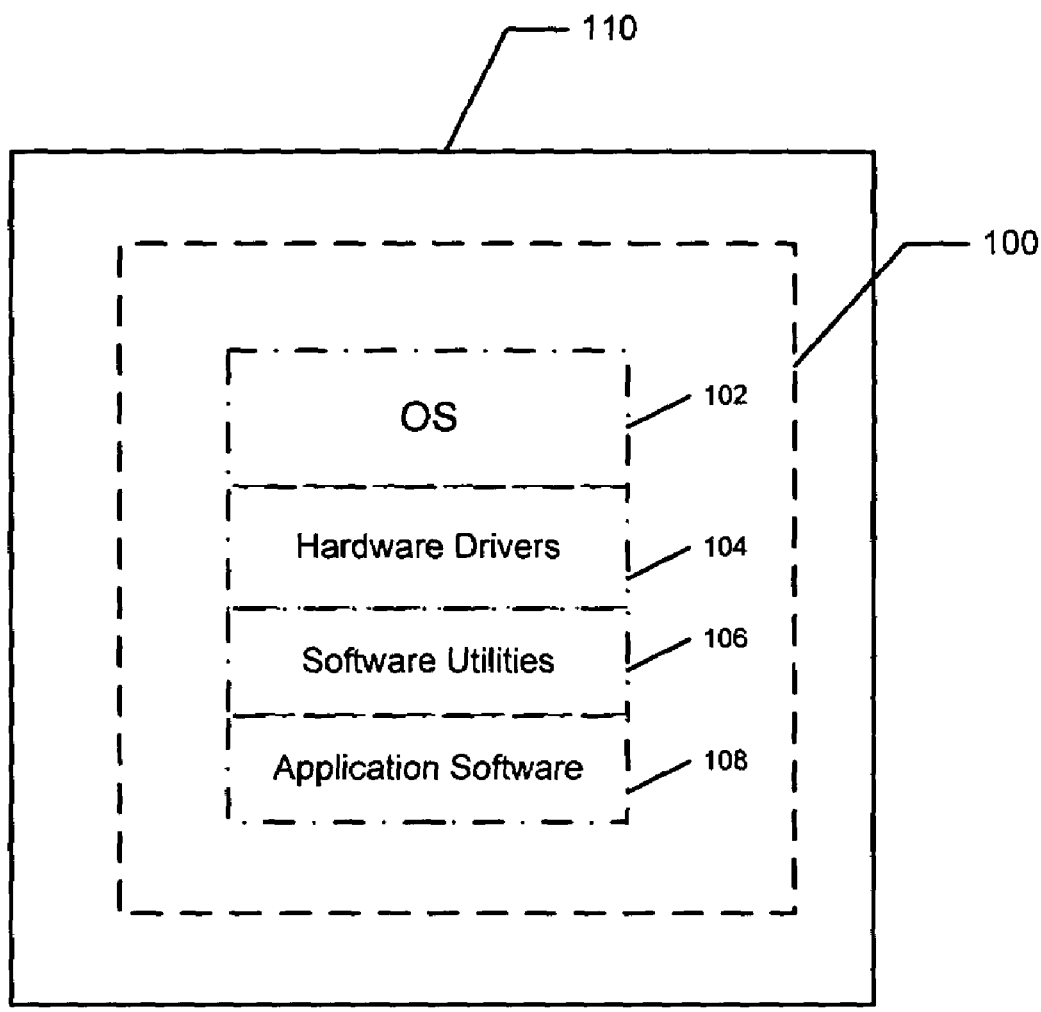
FIG. 3 is a block diagram of an example image that has been installed and stored on a hard disk drive in accordance with the present invention.

FIG. 3 is a block diagram of an example image 100 that has been installed and stored on a hard disk drive 110 in accordance with the present invention. The image 100 comprises an operating system (OS) 102, hardware drivers 104, software utilities 106, and commonly used application software 108. To use the image 100 in a hardware-independent environment, modules are created from the image 100. A "module," as used in this specification, is software that comprises one or more software programs, installation scripts, definitions, and other data for installing the software programs on a computer system or for combining the module with an existing image or with another module. The module can be removed from or added to an existing image as needed. A method for creating such a module is described below with FIG. 4.

Figure 4:
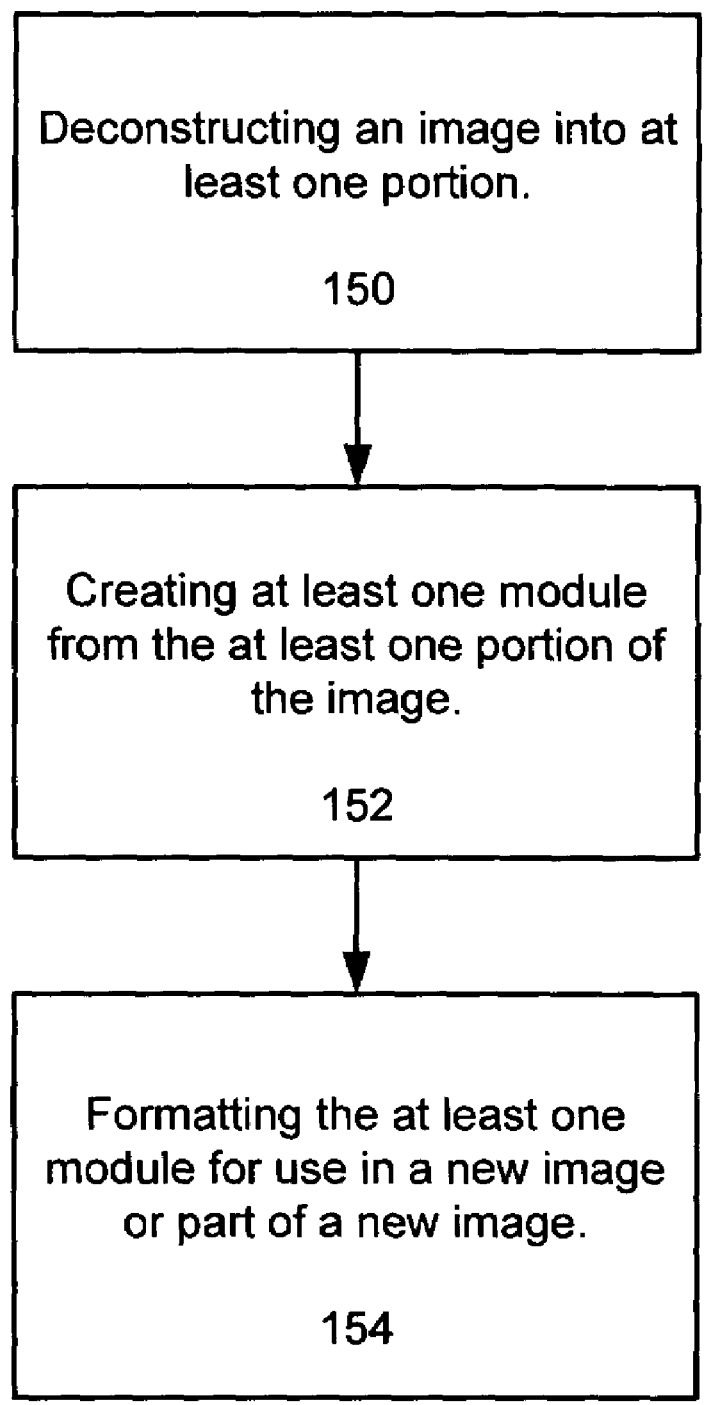
FIG. 4 is a flow chart showing a preferred embodiment of a method for providing an image of software installed on a computer system in accordance with the present invention.

FIG. 4 is a flow chart showing a preferred embodiment of a method for providing an image of software installed on a computer system in accordance with the present invention. Referring to both FIGS. 3 and 4, in a step 150, the image 100 is deconstructed into at least one portion. The deconstruction step is described further below with FIG. 5. Then, in a step 152, at least one module is created from at least one portion of the image 100. For example, specific application software 108, such as CD-RW software, could be modularized. There can be more than one module created depending on the specific application. The creating step 152 is also further described in detail below with FIG. 5. Still referring to FIG. 4, in a step 154, the module is formatted for use in a new image or part of a new image to be used with a particular software program such as a hardware-independent imaging tool. A hardware-independent imaging tool is a tool that builds images of software installed on computer systems. Such an imaging tool is hardware-independent because it operates independently from hardware infrastructure and thus can be implemented across different hardware platforms.

By storing an image as modules, modules can be added to or removed from an image as needed. This flexibility is useful when an image is to be copied to computer systems with different hardware configurations, even when portions of an image are not available for a particular computer system. Such differences can result when the hardware of one or computer systems are upgraded. For example, one or more computer systems might be upgraded from having a CD drive to a CD-RW drive, or simply be upgraded from an older version of the original device driver. Rather than creating an entirely new image for the new hardware configuration, the portion of the image related to the CD drive can be stored as a module. This module is then replaced with a module with the appropriate CD-RW software. The modified image can then be deployed to one or more computer systems with the new hardware configuration. The need to create an image with the CD-RW drive from scratch is avoided.

If the modules are formatted for use in a new image, the new image would be a modular-based imaged. Alternatively, if the modules are formatted for use in an existing image that is not entirely modular based, the portions of that image with the new modules will be modular based and the remaining portions need not be modular based. This process can take place on a single computer at a customer site. Alternatively, the process can take place remotely over a network such as an intranet or the internet.

Figure 5:
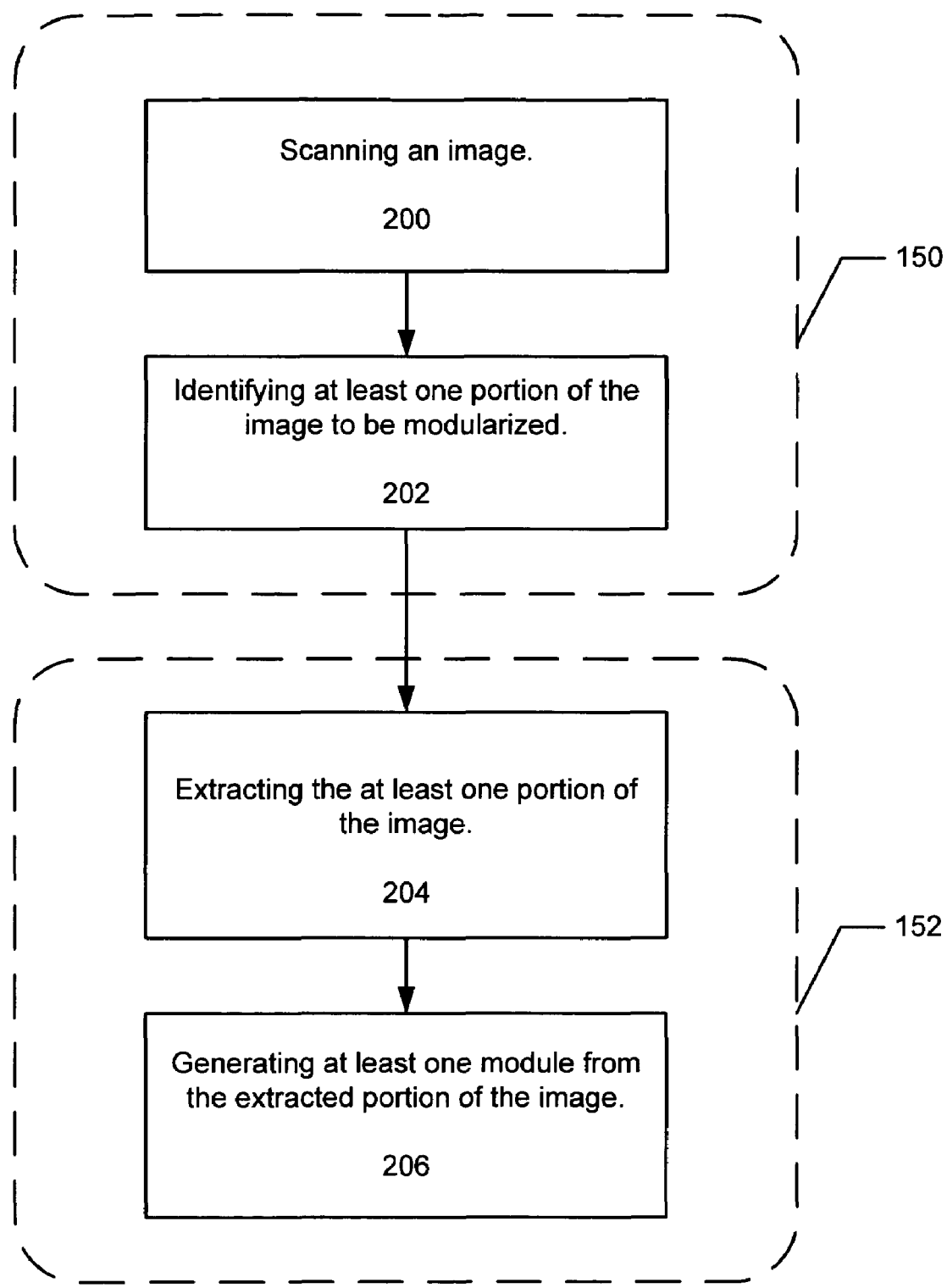
FIG. 5 is a flow chart showing in more detail the preferred embodiment of the method for providing an image of software installed on a computer system in accordance with another embodiment of the present invention.

FIG. 5 is a flow chart showing in more detail the preferred embodiment of the method for providing an image of software installed on a computer system in accordance with the present invention. Referring to both FIGS. 4 and 5, the deconstruction step 150 of FIG. 4 can be implemented by the following steps in FIG. 5. In a step 200, an image on a computer system is scanned. The image can be an existing image in a library of images. The scanned image comprises the files and dependencies for the software programs installed on the computer system. In a step 202, at least one portion of the image to be modularized is identified based on the results of the scan.

The criteria for identifying which portion(s) of the image to modularize will vary depending on the specific application. The portions to be modularized can be those portions associated with hardware-independent software programs (e.g., operating systems, drivers, and application software). Alternatively, the portions to be modularized can be those associated with hardware-dependent software programs (e.g., device drivers), or a combination of hardware-independent and hardware-dependent software programs.

The entire image can be modularized such that all portions of the image are modularized. Alternatively, selected portions of the image can be modularized. As such, after the image is scanned, a list of portions of the image available to be modularized is provided. The list can comprise, for example, software programs for operating systems, drivers and application software, which are present in the image. They can be hardware independent, hardware dependent, or a combination of both. One or more portions of the image from the list can be selected to be modularized. The selection can be done manually by the customer. Alternatively, the selection can be done automatically based on predetermined criteria, e.g., certain application software of a certain class. For example, such a class can include all spreadsheet application software.

Still referring to both FIGS. 4 and 5, the creating step 152 of FIG. 4 can be implemented by the following steps in FIG. 5. In a step 204, at least one portion of the image is extracted. In a step 206, at least one module from the extracted portion is generated. There can be one or more portions and one or more modules generated from each portion depending on the specific application. In the preferred embodiment, the module is generated using uninstall code, also referred to as uninstall "scripts," which are commonly used to remove an installed software program. To generate the module from the uninstall scripts, the uninstall scripts are first scanned/searched and analyzed in reversed order to determine the actions that have taken place to install the software. The uninstall scripts are typically stored in an uninstall file, in a registry, or in the OS software and accessed from a dynamic-link library (DLL). The uninstall scripts typically include data such as application specific actions, decrement reference counts, shared DLL files, removed registry keys, pointers, links, files copied, and/or moved, etc.

The module can then be installed onto a computer system or processed by an imaging tool by using install scripts that correspond to the uninstall scripts. The install scripts can be determined from information from the uninstall scripts in combination with log information related to the OS during an original installation. When a software program is installed under an OS, the OS maintains a log of actions taken during the installation process. For example, the log includes information on changes to the OS software. Such changes can include, for example, newly shared DLLs reference counts, removed tags, decremented reference counts, etc. Such information can be used to configure the generated install scripts. The install scripts are ascertainable because the install and uninstall procedures are standardized. Accordingly, existing information in the image can be used in a reverse engineering process to create install scripts from the uninstall scripts. The install and uninstall scripts can be stored in a location specified by the user or in a default location such as with the files needed by related software programs.

Still referring to FIG. 5, after the step 206, the module can then be formatted for use in a new image or part of a new image, and can be used with a software program, such as a hardware-independent imaging tool or other application software. The formatting can be done by running a set of wizards against the module. The wizards can also format modules for use in an image or part of an image to be compatible with a hardware-independent imaging tool, such as like IBM's ImageUltra®.

Once one or more modules are created, they can be stored in a module or image library and can be used or grouped as needed by the customer. For example, some of the modules can be used to create new modular-based hardware-independent images. Some of the modules can be used to modify existing hardware-independent modular-based images created in accordance with the present invention. Some of the modules can be used to modify existing images that are partly modular based. As can be seen, management of image inventory is greatly facilitated.

The modules can also be integrated into a software developer's kit such as IBM's ImageUltra™ Builder™, which allows the customer to buy one computer system, configure it as desired, build an image, and then copy the image from the hard drive of the original computer system to other identical computer systems. If a customer wants to add a software program to an image being built, ImageUltra™ adds an application wrapper around the software program. The application wrapper automates the installation of the software program. In the preferred embodiment, install scripts are integrated into the application wrapper.

In accordance with the present invention, an image can be made into modules even if the image was created by other technologies such as Microsoft's SysPrep™ image. The modules in accordance with the present invention would help customers to rapidly migrate their image inventory to take advantage of new hardware-independent technologies. This is because the modules eliminate or reduce the need for manual application installation, hardware testing and support.

An improved method for providing an image of software installed on a computer system is disclosed. The method includes the steps of deconstructing an existing image and creating one or more modules from all or part of the image. To deconstruct the image, the image is scanned to identify at least one portion of the image to be modularized. At least one portion of the image is then extracted, and at least one module is generated from that portion of the image. The module can then be formatted for use in a new image or part of a new image to be used with a particular software program, such as with a hardware-independent imaging tool or with other hardware-independent application software. An advantage of making an image modular is that it allows hardware-independent software programs (e.g., operating system, commonly used application software) to be abstracted or separated from hardware-dependent software programs (e.g., device drivers, hardware-dependent software). Modules can be added or removed from an image as needed, or can be combined to create new modular-based images.

Although the present invention has been described in accordance with the embodiments shown, one of ordinary skill in the art will readily recognize that there could be variations to the embodiments and those variations would be within the spirit and scope of the present invention. For example, modules can also be created at the batch level. Also, if a plurality of modules is created from the at least one portion of the image, the plurality of modules can comprise a combination of hardware-independent and hardware-dependent modules. As such, the plurality of modules can be used with hardware-independent or hardware-dependent software programs, a combination of both. Accordingly, many modifications may be made by one of ordinary skill in the art without departing from the spirit and scope of the appended claims.

What is claimed is:

1. A method for providing an image of software installed on a computer system, the method comprising:
   deconstructing the image into at least one portion;
   creating at least one module from the at least one portion of the image utilizing information, wherein the information is selected from a group consisting of install information and uninstall information; and
   formatting the at least one module for use in a new image or at least a portion of a new image.

2. The method of claim 1 wherein the deconstructing the image further comprises:
   scanning the image; and
   identifying at least one portion of the image to be modularized.

3. The method of claim 2 wherein the identifying at least one portion comprises:
   providing a list of portions of the image to be modularized; and
   selecting at least one portion of the image to be modularized.

4. The method of claim 1 wherein the at least one portion of the image represents at least one software program.

5. The method of claim 4 wherein the at least one software program is hardware independent.

6. The method of claim 1 wherein the at least one portion of the image represents a plurality of software programs.

7. The method of claim 6 wherein the plurality of software programs comprises a combination of hardware-independent and hardware-dependent software programs.

8. The method of claim 1 wherein the creating at least one module further comprises:
   extracting the at least one portion of the image; and
   generating the at least one module from the extracted portion of the image.

9. The method of claim 8 wherein the extracted portion of the image comprises uninstall scripts.

10. The method of claim 9 wherein the generating at least one module comprises:
    scanning the uninstall scripts; and
    generating install scripts from the uninstall scripts.

11. The method of claim 10 wherein the generating install scripts comprises:
    reversing the order of the uninstall scripts;
    determining uninstall scripts from the uninstall scripts; and
    configuring a portion of the install scripts.

12. The method of claim 1 wherein the software program is hardware-independent application software.

13. The method of claim 12 wherein the hardware-independent application software is a hardware-independent imaging tool.

14. The method of claim 1 wherein the module is hardware independent.

15. The method of claim 1 wherein the creating at least one module further comprises creating a plurality of modules from the at least one portion of the image.

16. The method of claim 15 wherein the plurality of modules comprises a combination of hardware-independent and hardware-dependent modules.

17. The method of claim 1 wherein the at least one portion of the image comprises an operating system and code, wherein the code is selected from a group consisting of a set of drivers, a set of utilities and application software.

18. A computer-readable storage medium including a computer program for providing an image of software installed on a computer system, comprising instructions for:
    deconstructing the image into at least one portion;
    creating at least one module from the at least one portion of the image utilizing information, wherein the information is selected from a group consisting of install information and uninstall information; and
    formatting the at least one module for use in a new image or at least a portion of a new image.

19. The medium of claim 18 wherein the deconstructing the image further comprises:
    scanning the image; and
    identifying the at least one portion of the image to be modularized.

20. The medium of claim 19 wherein the identifying at least one portion comprises:
    providing a list of portions of the image to be modularized; and
    selecting the at least one portion of the image to be modularized.

21. The medium of claim 18 wherein the at least one portion of the image represents at least one software program.

22. The medium of claim 21 wherein the at least one software program is hardware independent.

23. The medium of claim 18 wherein the at least one portion of the image represents a plurality of software programs.

24. The medium of claim 23 wherein the plurality of software programs comprises a combination of hardware-independent and hardware-dependent software programs.

25. The medium of claim 18 wherein the creating at least one module further comprises:
    extracting the at least one portion of the image; and
    generating at least one module from the extracted portion of the image.

26. The medium of claim 25 wherein the extracted portion of the image comprises uninstall scripts.

27. The medium of claim 26 wherein the generating at least one module comprises the:
    scanning the uninstall scripts; and
    generating install scripts from the uninstall scripts.

28. The medium of claim 27 wherein the generating install scripts comprises:
    reversing the order of the uninstall scripts;
    determining install scripts from the uninstall scripts; and
    configuring a portion of the install scripts.

29. The medium of claim 18 wherein the software program is a hardware-independent application software.

30. The medium of claim 29 wherein the hardware-independent application software is a hardware-independent imaging tool.

31. The medium of claim 18 wherein the module is hardware independent.

32. The medium of claim 18 wherein the creating at least one module further comprises creating a plurality of modules from the at least one portion of the image.

33. The medium of claim 32 wherein the plurality of modules comprises a combination of hardware-independent and hardware-dependent modules.

34. The medium of claim 18 wherein the at least one portion of the image comprises an operating system and code, wherein the code is selected from a group consisting of a set of drivers, a set of utilities and application software.

35. A computer-readable storage medium including a compute program for providing an image of software installed on a computer system, comprising instructions for:
    deconstructing the image into at least one portion;
    creating the at least one module from the at least one portion of the image utilizing uninstall code; and
    formatting the at least one module for use in at least a portion of a new image.

36. The medium of claim 35 wherein the at least one portion of the image comprises an operating system and code, wherein the code is selected from a group consisting of a set of drivers, a set of utilities and application software.

37. A system comprising:
    a storage medium; and
    a processing system coupled to the storage medium, the processing system including a mechanism for deconstructing an image into at least one portion; creating at least one module from at least one portion of the image utilizing information wherein the information is selected from a group consisting of install information and uninstall information; and
    formatting the at least one module for use in a new image or at least a portion of a new image.

38. The system of claim 37 wherein the deconstructing the image comprises:
  scanning the image; and
  identifying at least one portion of the image to be modularized.

39. The system of claim 38 wherein the identifying at least one portion comprises:
  providing a list of portions of the image to be modularized; and
  selecting at least one portion of the image to be modularized.

40. The system of claim 37 wherein the at least one portion of the image represents at least one software program.

41. The system of claim 40 wherein the at least one software program is hardware independent.

42. The system of claim 37 wherein the at least one portion of the image represents a plurality of software programs.

43. The system of claim 42 wherein the plurality of software programs comprises a combination of hardware-independent and hardware-dependent software programs.

44. The system of claim 37 wherein the creating at least one module further comprises:
  extracting the at least one portion of the image; and
  generating the at least one module from the extracted portion of the image.

45. The system of claim 44 wherein the extracted portion of the image comprises uninstall scripts.

46. The system of claim 45 wherein the generating at least one module comprises:
  scanning the uninstall scripts; and
  generating install scripts from the uninstall scripts.

47. The system of claim 46 wherein the generating install scripts comprises:
  reversing the order of the uninstall scripts;
  determining the uninstall scripts from the uninstall scripts; and
  configuring a portion of the install scripts.

48. The system of claim 37 wherein the software program is hardware-independent application software.

49. The system of claim 48 wherein the hardware-independent application software is a hardware-independent imaging tool.

50. The system of claim 37 wherein the module is hardware independent.

51. The system of claim 37 wherein the creating at least one module further comprises creating a plurality of modules from the at least one portion of the image.

52. The system of claim 37 wherein the plurality of modules comprises a combination of hardware-independent and hardware-dependent modules.

53. The system of claim 37 wherein the at least one portion of the image comprises an operating system and code, wherein the code is selected from a group consisting of a set of drivers, a set of utilities and application software.

54. A system comprising:
  a storage medium; and
  a processing system coupled to the storage medium, the processing system including a mechanism for deconstructing an image into at least one portion; creating at least one module from the at least one portion of the image utilizing uninstall code; and formatting the at least one module for use in a new image or at least a portion of a new image.

55. The system of claim 54 wherein the at least one portion of the image comprises an operating system and code, wherein the code is selected from a group consisting of a set of drivers, a set of utilities and application software.

* * * * *